US009992690B2

(12) United States Patent
Butchko et al.

(10) Patent No.: US 9,992,690 B2
(45) Date of Patent: Jun. 5, 2018

(54) PLACED WIRELESS INSTRUMENTS FOR PREDICTING QUALITY OF SERVICE

(71) Applicant: Textron Innovations Inc., Providence, RI (US)

(72) Inventors: Jason Edward Butchko, Temecula, CA (US); Mark Barmettler, San Diego, CA (US)

(73) Assignee: Textron Innovations, Inc., Providence, RI (US)

( * ) Notice: Subject to any disclaimer, the term of this patent is extended or adjusted under 35 U.S.C. 154(b) by 108 days.

(21) Appl. No.: 14/506,106

(22) Filed: Oct. 3, 2014

(65) Prior Publication Data

US 2015/0103685 A1 Apr. 16, 2015

Related U.S. Application Data

(60) Provisional application No. 61/890,171, filed on Oct. 11, 2013.

(51) Int. Cl.
*H04W 24/02* (2009.01)
*H04W 24/08* (2009.01)
(Continued)

(52) U.S. Cl.
CPC ............ *H04W 24/02* (2013.01); *H04L 41/145* (2013.01); *H04L 41/147* (2013.01);
(Continued)

(58) Field of Classification Search
CPC ......... H04L 41/12; H04L 41/14; H04L 41/22; H04L 41/24; H04L 43/00; H04L 43/02–43/05; H04W 16/18–16/225; H04W 24/00; H04W 84/12; H04W 88/12; H04W 24/02–24/10; H04W 88/12
See application file for complete search history.

(56) References Cited

U.S. PATENT DOCUMENTS 7,539,489 B1 * 5/2009 Alexander ............ H04W 24/06
370/241
7,596,373 B2 9/2009 McGregor et al.
(Continued)

FOREIGN PATENT DOCUMENTS

WO 2009/022054 A1 2/2009

OTHER PUBLICATIONS

AirCheck Wi-Fi Tester—Wireless Network Tester—Fluke Networks—www.flukenetworks.com/enterprise-network/network-testing/AirCheck-Wi-Fi-Tester—2 pages.
(Continued)

*Primary Examiner* — Timothy J Weidner
(74) *Attorney, Agent, or Firm* — Erise IP, P.A.

(57) ABSTRACT

A system determines wireless network performance. A wireless instrument is configured to send, receive and measure received wireless signals in a monitored area. A master controller connected with the wireless instrument forms a distributed wireless network testing solution. The master controller is configured to send and receive wireless signals with the wireless instrument, measure received wireless signals and perform an analysis of the wireless signals to determine a radio frequency environment performance of the distributed wireless network based on the wireless signals.

25 Claims, 11 Drawing Sheets

(51) Int. Cl.
  *H04W 24/06* (2009.01)
  *H04W 16/22* (2009.01)
  *H04W 88/12* (2009.01)
  *H04W 84/12* (2009.01)
  *H04L 12/26* (2006.01)
  *H04L 12/24* (2006.01)

(52) U.S. Cl.
  CPC ...... *H04L 41/5038* (2013.01); *H04L 41/5067* (2013.01); *H04L 43/0882* (2013.01); *H04L 43/0888* (2013.01); *H04L 43/50* (2013.01); *H04W 16/225* (2013.01); *H04W 24/06* (2013.01); *H04W 24/08* (2013.01); *H04W 84/12* (2013.01); *H04W 88/12* (2013.01)

(56) References Cited

U.S. PATENT DOCUMENTS

| | | | |
|---|---|---|---|
| 7,889,663 B1 * | 2/2011 | Wright | H04W 24/06 370/241 |
| 8,023,418 B2 | 9/2011 | Curley | |
| 8,390,515 B2 | 3/2013 | Ketonen | |
| 8,625,441 B2 * | 1/2014 | Hittel | H04W 24/08 370/252 |
| 8,654,660 B2 | 2/2014 | Ketonen | |
| 8,750,806 B2 * | 6/2014 | Weil | H04L 12/2697 370/230 |
| 8,824,328 B2 * | 9/2014 | Dhanapal | H04L 41/083 370/252 |
| 2004/0137915 A1 | 7/2004 | Diener | |
| 2012/0307662 A1 | 12/2012 | Puolakka et al. | |
| 2014/0160971 A1 | 6/2014 | Ketonen | |
| 2014/0160972 A1 | 6/2014 | Ketonen | |

OTHER PUBLICATIONS

European Examination Report in connection with European Patent Application No. 14187880.1 dated Apr. 16, 2015, 8 pages.

European Patent Application No. 14187880.1 Office Action dated Jun. 28, 2017.

* cited by examiner

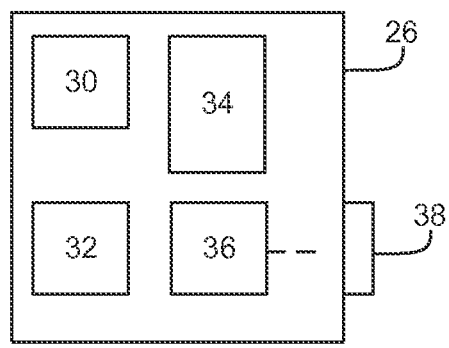
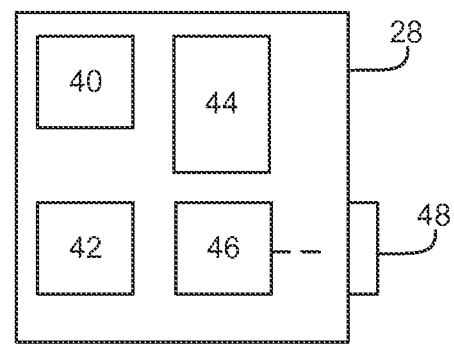
Figure 2                    Figure 3

PLACED WIRELESS INSTRUMENTS FOR PREDICTING QUALITY OF SERVICE

CROSS-REFERENCE TO RELATED APPLICATIONS

This application claims the benefit of U.S. Provisional Patent Application Ser. No. 61/890,171, filed Oct. 11, 2013, the entire contents of which are incorporated by reference herein.

FIELD

The present disclosure relates to a placed wireless instrument used to characterize a communication spectrum, such as a wireless spectrum, in an area and to predict the quality of service for a given area for wireless system deployment.

BACKGROUND

Because of interference, congestion and signal issues, users of wireless networks often experience degradation of services over the wireless network in which data is transmitted. Currently employed wireless network installation and validation methods may be inadequate to identify common sources of wireless network degradation. The inability to identify and correct network degradation negatively may affect the customer's quality of experience, resulting in excess service and repair visits, customer dissatisfaction, and customer turn over.

Placement of a Wi-Fi enabled gateway is an important consideration for improving Wi-Fi network quality of service. Unfortunately the current method for placing a Wi-Fi enabled gateway is random from a quality of service point of view and is driven by the technician selecting the most convenient location for the Wi-Fi enabled gateway or the customer dictating the location. This method of locating a Wi-Fi enabled gateway does not take into account interference or attenuation and therefore often results in poor quality of service. Using an existing solution such as a current tester device may present an improvement over the current random method for locating the Wi-Fi enabled gateway; however, the use of the current tester device may require a technician to walk to each location within the premise served by the Wi-Fi network and validate the Wi-Fi quality of service. If the quality of service is unacceptable at any location in the premise the technician would need to move the Wi-Fi enabled gateway to a new position which is assumed to be better and repeat the entire quality of service validation.

Current tester devices also fall short in that they take a "one time snapshot" of the radio disturbers and network performance. During this analysis, interfering devices may not be operating, which may result in a poor location placement of the gateway and inconsistent wireless network performance. Therefore a single testing device that takes a "one time snapshot" of the network are not practical for validating the quality of services delivered by a Wi-Fi network.

SUMMARY

Some example embodiments provide a system that may be used to determine wireless network performance. The system of such embodiments may include a wireless instrument configured to send wireless signals in a monitored area and to measure received wireless signals. The system may further include a master controller configured to connect with the wireless instrument to form a distributed wireless network testing solution. The master controller may be further configured to receive the wireless signals measured by the wireless instrument and to analyze the wireless signals to determine a radio frequency environment of the distributed wireless network based on the wireless signals.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF DRAWINGS

In association with the following detailed description, reference is made to the accompanying drawings, which are not necessarily drawn to scale, and where like numerals in different figures may refer to the same element.

FIG. 2 is a block diagram of an example wireless instrument.

FIG. 3 is a block diagram of an example master controller.

DESCRIPTION

Figure 1:
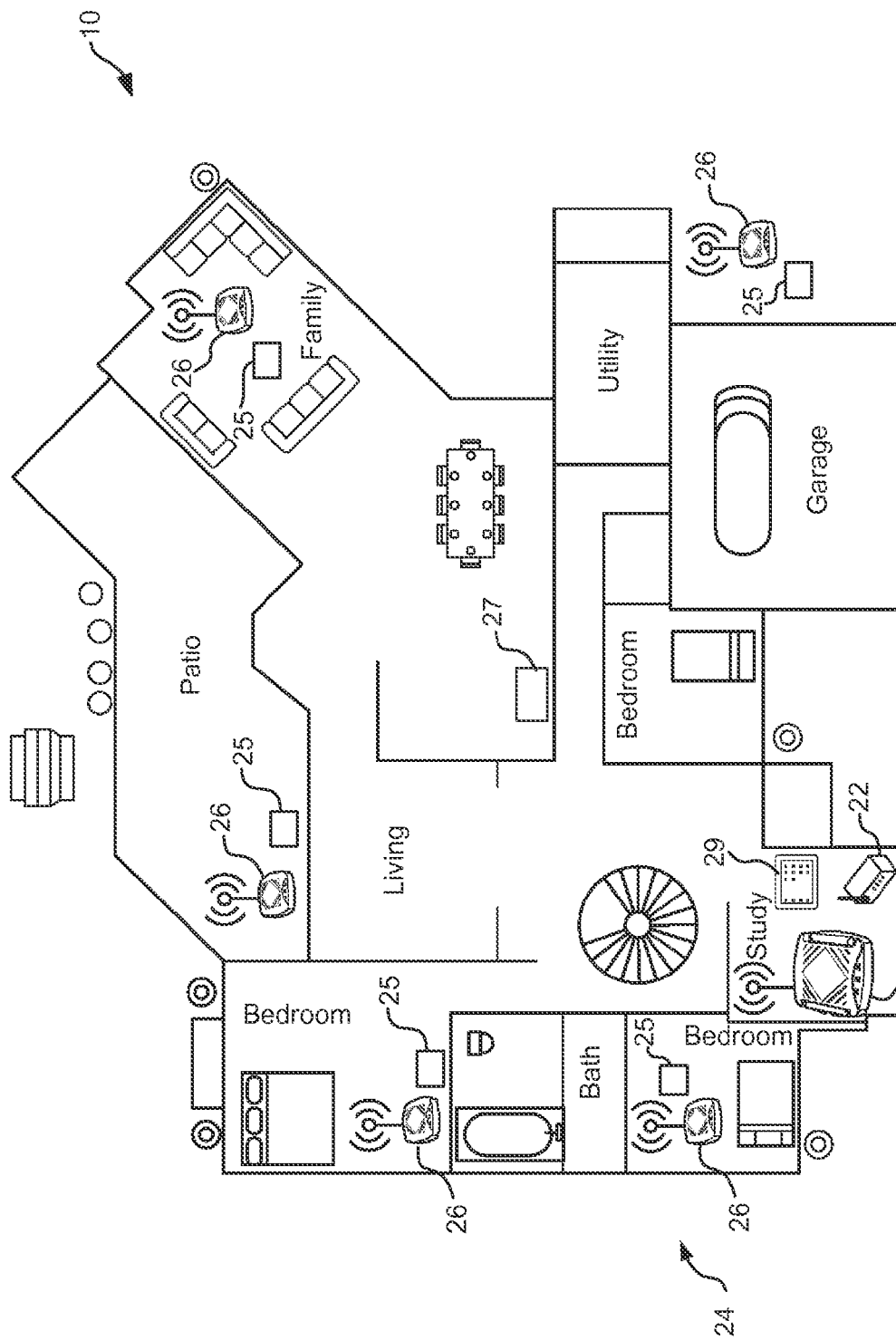
FIG. 1 is an example environment for determining wireless interference and congestion in the environment.

While the embodiments may be susceptible to different forms, there is shown in the drawings, and herein will be described in detail, specific embodiments with the understanding that the present disclosure is to be considered an exemplification of the principles of the embodiments, and is not intended to limit the embodiments to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative embodiments within the scope of the disclosure.

FIG. 1 is an example environment 10 for which wireless interference and congestion may be determined by the system of some example embodiments. A system 20 and methods are provided for determining the proper placement of a Wi-Fi enabled gateway 22 in a wireless network having an area 24 for operating wireless devices 25 to be placed in the area 24. Proper placement may include an optimal or ideal placement of the gateway 22. The system 20 and methods take into account interference, congestion and signal strength from existing devices 27 within a wireless spectrum on which the gateway 22 and wireless devices 25 are operating. The ability of a wireless network to operate reliably while moving vast amounts of data is dependent upon a variety of factors, including, for example, the strength of the wireless signal, the number of receivers receiving a wireless signal broadcast on a given channel, the number of transmitters on a given channel or overlapping channels, radio interference from devices that broadcast a wireless signal and/or share the same or similar radio frequency spectrum, broadband radio interference and obstacles that break the line of site propagation of the wireless signal. Interference and congestion may be caused by devices, such as other wireless enabled devices, microwaves, cordless phones, baby monitors, etc. and signal attenuation may be due to materials or distances between wireless devices and the Wi-Fi access point. Operating in the wireless spectrum, such wireless devices 25 to be later placed may be, for example but not limited to a wireless set top box, a wireless laptop or desktop personal computer (PC), an Internet protocol (IP) Video Security Camera, a wireless light controller, wireless motion detector, wireless doorbells, other home automation device, wireless telephones, wireless enabled media devices, wireless home appliances, etc. Wireless devices 25 causing interference and congestion may include any wireless device operating or transmitting in the same frequency range.

The area 24 is a geographical location of a determined size which may be within a residence, within a school, an outside area, within a commercial area such as an office, a hospital and an airport, etc. The system 20 and methods may be used to analyze characteristics, such as channel usage, signal strength, and performance characteristics of a wireless spectrum, which includes existing devices 27 which may interfere with wireless transmission within the wireless spectrum which are already located in or near the area 24. Additionally or alternatively the wireless spectrum may include the cellular domain. Existing devices 27 are any devices which already exist within or near the area 24 which broadcast a wireless signal that is near or within the wireless spectrum in which the gateway 22 and wireless devices 25 are operating on. An example of such an existing device 27 is a microwave, wireless set top box, a wireless laptop or desktop PC, an IP Video Security Camera, a wireless light controller, wireless motion detector, wireless doorbells, other home automation device, wireless telephones, and baby monitors.

The system 20 includes at least one wireless instrument(s) 26, a master controller 28 in communication with the at least one wireless instrument(s) 26 and a user interface device 29, which together form a distributed wireless network testing solution. The wireless network testing solution may provide an outside-in view of the wireless network (client side) versus an inside-out view provided through the existing network access points or gateways. The master controller 28 is an intelligent device with wireless access point (AP) capability and may be placed where a gateway 22 is to be placed later, e.g., when determining where to place the gateway 22. The master controller 28 may be a dedicated device or a wireless instrument(s) 26 operating as the master controller. The user interface device 29 sends control commands to the master controller 28, which may in turn send commands to the wireless devices 26, and receives information from the master controller 28, e.g., for determining congestion, interference and/or signal strength in the environment 10, as described in more detail below.

The wireless instrument(s) 26 may be a battery or externally powered-enabled device which operates within the wireless spectrum to make radio frequency (RF) and low level signaling measurements while receiving/transmitting data encoded with wireless signals that are being transmitted or received within the that wireless spectrum. For example, a wireless signal that operated within a 2.4 GHz or 5 GHz wireless spectrum transmits data encoded in one a variety of formats, on one or more channels, e.g., the Institute of Electrical and Electronics Engineers (IEEE) 802.11 (a/b/g/n), 802.11 ac, 802.11 ad, and/or other present or future developed IEEE 802.11 version for household or enterprise Wi-Fi capability.

To validate available bandwidth the wireless instrument(s) 26 may be programmed to simulate the capability and application traffic data patterns running on the customer's wireless device. For example, the wireless instrument(s) 26 in the family room may be programmed to simulate client Wi-Fi enabled devices and their applications such as a TV set top box, a personal computer, or a tablet, etc. While the wireless instrument(s) 26 in the bedroom may be programmed to simulate client Wi-Fi enabled devices and their applications such as a smart phone, tablet or a baby monitor. The wireless instrument(s) 26 may be programmed by adjusting settings on the respective wireless instrument(s) 26, or programmed by the master controller 28 using the user interface device 29 to send a profile to each wireless instrument which indicates what type of wireless device 25 and applications the wireless instrument(s) 26 is to simulate. When programmed without profiles the wireless instruments attempts to obtain the minimum required bandwidth and then a multiplier of the minimum bandwidth from the network to validate network performance under normal and stressed conditions.

FIG. 2 is a block diagram of an example wireless instrument(s) 26. Generally, each wireless instrument(s) 26 has a processor 30, which may include multiple processors. The processor 30 may be configured, such as through execution of software and/or by way of hardware configuration, to collect and analyze data relating to the signal strength of a wireless signal, the number of receivers on a channel, the signal strength of each channel that the wireless signal is being transmitted on, and transmission of data on an overlapping adjacent channel and radio interference from existing devices 27 are transmitted on an adjacent or overlapping wireless spectrum. It will be appreciated that the illustration of FIG. 2 is provided by way of example, and not by way of limitation. In some example embodiments, one or more elements illustrated in and described with respect to FIG. 2 may be omitted. Additionally or alternatively, in some example embodiments, wireless instrument(s) 26 may include one or more additional elements to those illustrated in and described by way of example with respect to FIG. 2.

In some embodiments, a wireless instrument(s) 26 also includes memory 32 which may, for example, include embedded memory, an external memory card, and/or other memory device(s). It will be appreciated that, in some embodiments, memory 32 may include multiple memory devices, including various combinations of different types of memory. The wireless instrument(s) 26 may further include a user interface 34 in communication with the processor 30 for inputting instructions into the processor 30. The wireless instrument(s) 26 may additionally include communication hardware for sending/receiving information to/from the master controller 22 and/or the gateway 22. The communication hardware may, for example, include a receiver/transceiver 36, one or more antennas 38, and/or other appropriate hardware that may provide a communication interface for wirelessly sending/receiving information.

The memory 32 may store the software which includes code that, when executed by the processor 30, causes the processor 30 (or wireless instrument(s) 26) to perform the functions/methods described herein. Additionally or alternatively, functions may be performed through particularly configured hardware, such as an application specific integrated circuit (ASIC), field-programmable gate array (FPGA), etc. that may not rely on software, or that at least may be hybridized approach using a combination of specially configured hardware and a processor executing instructions. In some embodiments using such particularly configured hardware, the particularly configured hardware may implement aspects of the processor 30. The wireless instrument(s) 26 may analyze the existing radio environment to identify wireless spectrum interference, identify existing wireless devices and their channel mapping, characterize the wireless spectrum signal strength, build a graphical 'heat map' of the monitored area to indicate coverage area and communication overlap for the wireless instruments 26. The wireless instrument(s) 26 may transmit and receive test wireless signals to and from the master controller 28, in order to analyze the existing radio environment and determine the integrity of the wireless network and the amount of interference within the wireless spectrum on which the gateway 22 and wireless devices 25 are operating.

Another embodiment of the wireless instrument(s) 26 includes a commercially available device such as a smart phone, tablet, laptop or PC with Wi-Fi capability that may operate on one a variety of operating systems such as Microsoft Windows™ (a registered trademark of Microsoft Corporation), Apple™ iOS (a registered trademark of Apple Inc.), Apple ™ OSX, Google™ Android (a registered trademark of Google Inc.), or Linux™ (a registered trademark owned by Linus Torvalds). The wireless instrument(s) 26 may be implemented as a software application on such devices.

An example of a device that may analyze the existing radio environment to characterize the target spectrum and establish an interference map of a monitored area is Fluke Networks™ AirCheck (a registered trademark of Fluke Corporation). The Fluke Networks™ AirCheck Wi-Fi Tester provides a snap shot at a single geographical point of the area being monitored. Unlike current Fluke Networks™ AirCheck other known testers, the wireless instrument(s) 26 is further programmed to analyze the existing radio environment at one or more points simultaneously over a continuous period of time and communicate with the master controller 28.

FIG. 3 is a block diagram of an example master controller 28. The master controller 28 is a computer which may execute an application in the form of software and/or hardware and may send and receive information to and from each wireless instrument(s) 26 and a user interface device 29 (FIG. 1). The user interface device 29 may be incorporated into the wireless instrument(s) 26 and/or master controller 28, and/or may be a separate device, e.g., a tablet, a smart phone, laptop, PC, etc. The user interface device 29 may be a device dedicated to displaying information from the master controller 28 or a device that executes various applications including one for the master controller 28.

Generally, the master controller 28 has a processor 40, which may include multiple processors. The processor 40 may be configured, such as through execution of software and/or by way of hardware configuration, to collect and analyze information from the wireless instruments 26 relating to the strength of radio reception, the number of receivers on a channel, the signal strength of each channel that the wireless signal is being transmitted on, and transmission of data on an overlapping adjacent channel and radio interference from devices that share radio frequency spectrum. The master controller 28 may further include memory 42, which may, for example, include embedded memory, an external memory card, and/or other memory device(s). It will be appreciated that, in some embodiments, memory 42 may include multiple memory devices, including various combinations of different types of memory. The master controller 28 may additionally include communication hardware for sending/receiving information to/from wireless instruments 26 and/or the gateway 22. The communication hardware may, for example, include a receiver/transceiver 46, one or more antennas 48, and/or other appropriate hardware that may provide a communication interface for wirelessly sending/receiving information. Additionally or alternatively, functions may be performed through particularly configured hardware, such as an application specific integrated circuit (ASIC), field-programmable gate array (FPGA), etc. that may not rely on software, or that at least may be hybridized approach using a combination of specially configured hardware and a processor executing instructions. In some embodiments using such particularly configured hardware, the particularly configured hardware may implement aspects of the processor 40.

The master controller 28 of some embodiments may include and/or otherwise be in operative communication with a user interface device 29. The user interface device 29 may be in operative communication with the processor 40 for inputting instructions into the processor 40. The user interface device 29 may be implemented with a smart phone, tablet, laptop, PC, etc. that may be connected to the master controller 28 by way of a wireless and/or wired connection.

It will be appreciated that the illustration of FIG. 3 is provided by way of example, and not by way of limitation. In some example embodiments, one or more elements illustrated in and described with respect to FIG. 3 may be omitted. Additionally or alternatively, in some example embodiments, wireless instrument(s) 26 may include one or more additional elements to those illustrated in and described by way of example with respect to FIG. 3.

Figure 4:
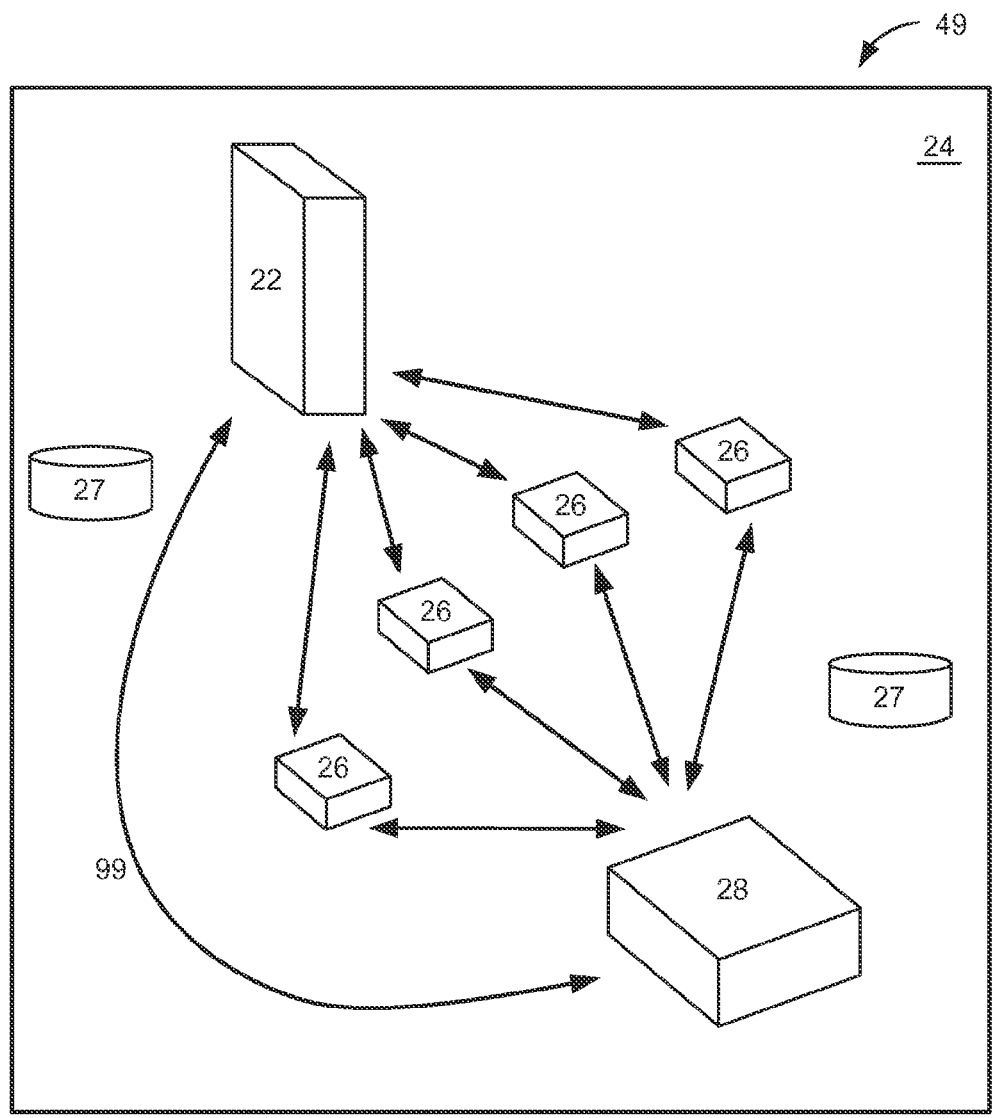
FIG. 4 is a block diagram of an example communication network implementing the master controller in the environment.

FIG. 4 is a block diagram of an example communication network 49 implementing the master controller 28 in the environment 10. The master controller 28 may connect and communicate wirelessly, e.g., via an AP to client network configuration 99, with each wireless instrument(s) 26 after each wireless instrument(s) 26 is placed in the area 24. It will be appreciated, however, that other (e.g., non-structured) network configurations may be used, including, for example, an ad hoc network configuration. The processor 40 of the master controller 28 may be configured to analyze information received from the wireless instrument(s) 26, and send information to the wireless instrument(s) 26, as described in more detail below.

In some example embodiments, the functionalities of the master controller may be provided by a Wi-Fi enabled premise gateway executing third party software, such as may be provided by Greenlee™ (a registered trademark of Greenlee Textron, Inc.) that may operate on one of a variety of operating systems such as Microsoft™ Windows, Apple™ iOS, Apple ™ OSX, Google™ Android, or Linux™. When executing such software, the premise gateway may be configured to perform functionality of a master controller in accordance with various embodiments disclosed herein.

In some example embodiments, the master controller may comprise through a connections, such as a universal serial bus (USB) connection, Ethernet connection, FireWire ™ connection (a registered trademark of Apple Inc.), Thunderbolt™ connection (a trademark of Intel Corporation), and/or other appropriate wireline connection that may be used to communicatively couple computing devices. In some embodiments in which the master controller connects to the premise gateway, the master controller may obtain at least a portion of its operating power (e.g., via a USB connection) from the gateway. Thus, in some such embodiments, the master controller may not use a battery or other external power source beyond the gateway.

In some example embodiments, the master controller may be implemented by a commercially available device such as a smart phone, tablet, laptop or PC with Wi-Fi capability that may operate on one a variety of operating systems such as Microsoft™ Windows, Apple ™ iOS, Apple™ OSX, Google™ Android, or Linux™. In this regard, the commercially available device may be configured through software to perform functionality of a master controller in accordance with various embodiments disclosed herein.

The gateway 22 is a computer networking device that routes packets of data encoded within the wireless signal from the wireless network to another network, typically a wired wide-area network (WAN). The gateway 22 may communicate with the wireless instruments 26, with the master controller 28, the user interface device 29 and with the customer's wireless devices 25 which are to be placed later.

Figure 5:
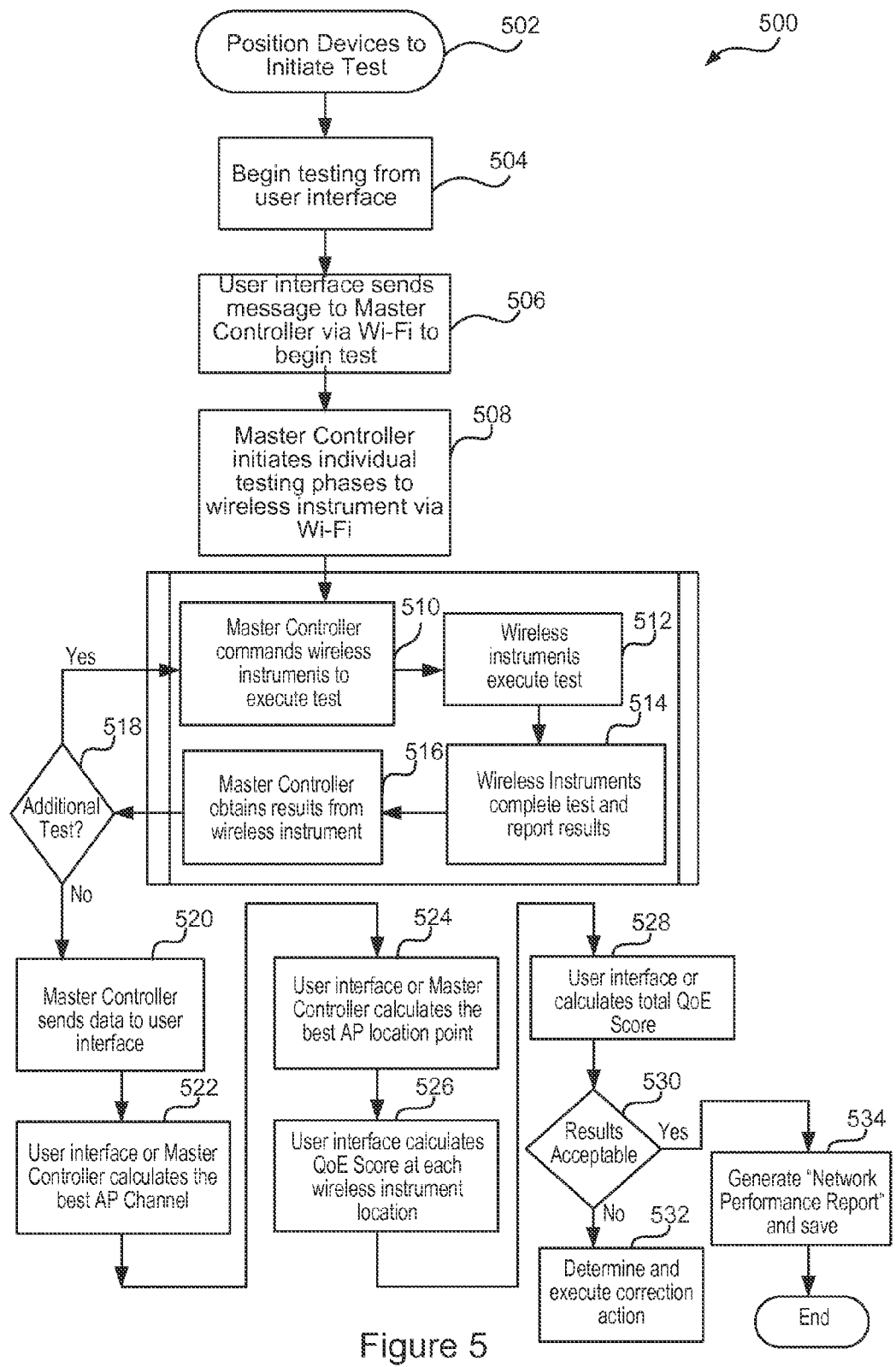
FIG. 5 is a flowchart of an example process for analyzing an RF environment to determine congestion, interference and/or signal strength.

FIG. 5 is a flowchart of an example process 500 for analyzing an RF environment, e.g., environment 10, to determine congestion, interference and/or signal strength. The process 500 may also apply to many other types of environments, e.g. commercial space, airports, schools, outdoor environments, vehicles, etc. The process 500 may identify possible communication problems in the environment 10, suggest potential resolutions to the problems, and set the customer's expectations. As described in more detail below, the process 500 may suggest preferred Wi-Fi channels available for the environment 10, suggest preferred location(s) for the Wi-Fi AP(s), and/or provide a quality of experience (QoE) metric to set the customer's expectations.

To initiate the testing, devices are positioned, e.g., the wireless instrument(s) 26, the master controller 28, and the user interface device 29, to analyze an environment, such as environment 10 (502). Once the master controller 28 is powered on or otherwise activated, or in other embodiments connected to the gateway 22 which is powered, the master controller's access point radio may be activated, thereby allowing the user interface device 29 and wireless instruments 26 to establish a connection, e.g., wirelessly, with the master controller 28. The wireless instruments 26 are placed at each location where the technician desires to characterize the wireless spectrum and simulate the performance of the wireless device 25 to be placed later. For example, the wireless instruments 26 may be positioned in the bedrooms, the family room, the patio and next to the garage, etc., to replicate signals coming from Wi-Fi enabled devices such as wireless set top boxes, wireless laptops or desktop PCs, IP Video Security Cameras, wireless light controllers, wireless motion detectors, wireless doorbells, other home automation device, wireless enabled media devices, wireless home appliances, wireless telephones, baby monitors, etc.

The user interface device 29 of some example embodiments includes software, hardware and/or firmware to execute instructions for performing testing and analysis of the environment 10, in cooperation with the master controller 28 and wireless instruments 26. The user interface device 29 sends a command to the master controller 28 to begin testing the environment 10 (506). Each wireless instrument(s) 26, when placed and turned on, analyzes the existing radio environment over a continuous period of time to characterize Wi-Fi interference, congestion and signal reach by analyzing the target spectrum, identifying radio interference, network disturbers, existing radio access points, channel allocation and, signal strengths of a portion of the area 24 within range of the wireless instrument 24. Once placed and turned on, as commanded by the master controller 28, the wireless instruments 26 may conduct interference, congestion and signal reach measurements of wireless signals that would emanate from existing devices 27 at the specific points of placement. Each wireless instrument(s) 26 collects the information regarding interference, congestion and signal reach and stores the information in its memory 32. By understanding the wireless network capability, the user interface device 29 may predict how the radio frequency environment will behave, and the behavior of the environment may be used to determine a maximum data bandwidth that may be accommodated, e.g., for network performance.

For example, based on a command from the user interface device 29, the master controller 28 may send commands to the wireless instruments 26 to initiate individual testing phases by the wireless instruments 26 (508). One test may include parsing AP channels In this regard, the master controller 28 may command the wireless instruments 26 to parse the channel information from the beacon frames transmitted by visible AP's and to determine what channel widths visible AP supports (510). The wireless instruments 26 may execute the test by parsing the AP channel information for different channels (512). The wireless instrument(s) 26 may complete the test and report the results (514). The master controller 28 obtains the results from the wireless instruments 26, e.g., by receiving the reports sent wireless by the wireless instruments 26 to the master controller 28.

The master controller 28 may determine if additional tests remain to be conducted (518). In addition to parsing the AP channel information, additional tests, such as station analysis, may be used to measure the channel congestion. Congestion, also known as channel utilization, is a measurement of how busy the medium is with other competing Wi-Fi traffic. Measuring congestion may be a temporal phenomenon (e.g., high burst of traffic) during the evening hours in a residential setting or during the day in an office environment. Therefore, a more thorough measurement of congestion may be performed over an extended period of time, e.g., to detect daytime traffic, nigh-time traffic, traffic over a twenty-four hour period, traffic for the week, and/or traffic for a month, traffic over a year, etc.

The master controller 28 commands the wireless instruments 26 to perform a packet capture and analyze the traffic to determine the number and types of stations connected to the AP(s) to uncover local interference sources, e.g., a strong Wi-Fi TX device in the room, and discover additional clients and APs that the AP parsing scan did not discover, e.g., devices like thermostats, security cameras, etc. and video streaming devices like Apple™ TVs, Roku™ (a registered trademark of Roku, Inc.), Smart TVs, etc. The master controller 28 may also command the wireless instruments 26 to parse the IEEE 802.11k information. If an AP is IEEE 802.11k compliant, the wireless instruments 26 parse the AP beacon information to obtain the number of clients connected to the AP and channel utilization factor.

Another test includes channel usage. The master controller 28 may command the wireless instruments 26 to perform a packet capture and analyze the traffic to determine the channel utilization based on packet length and transmit data rate. The master controller 28 may also command the wireless instruments 26 to check for transmit latency measuring the time from when a packet is queued to when the packet arrives at the receiver. This may be used to measure the congestion in the air. The master controller 28 may command the wireless instruments 26 to conduct retry analysis by performing a packet capture and analyzing the traffic to determine the percentage of traffic that is a retry. This may help for understanding if the congestion is due to excessive retries between devices. The master controller 28 may also command the wireless instruments 26 to check data rate distribution by performing a packet capture and analyzing the traffic to determine the data rate used between links. This helps to understand if the congestion is due to devices using low data rates that consume to much medium time. The master controller 28 may also command the wireless instruments 26 to determine throughput by performing a throughput measurement and comparing the result with a reference measurement for an environment with no congestion. The throughput measurement may use a data pattern similar to streaming video, streaming audio, or web surfing services.

To measure non-Wi-Fi interference, the master controller 28 may also command the wireless instruments 26 to analyze receive sensitivity by transmitting a series of packets at predetermined transmit (TX) data rates to infer the environment's signal-to-noise ratio (SNR). The master controller 28 may command the wireless instruments 26 to check media access control (MAC) cycle counters. The radio's MAC hardware may include registers configured to count the number of clock cycles the MAC consumes transmitting or receiving a frame and consumes processing other signals. The other signals may be considered non-Wi-Fi interference. The master controller 28 may also command the wireless instruments 26 to determine a noise floor. A high noise floor indicates some sort of local interference is present. The noise floor may be measuring over an extended period of time. The master controller 28 may command the wireless instruments 26 to check the physical layer (PHY) Error Counters. The radio's MAC may include counters configured to measure the number of PHY errors the RX engine is detecting while looking for Wi-Fi signals. The master controller 28 may also command the wireless instruments 26 to perform a spectrum analysis. New generation radios have a special mode that exposes low-level IQ values of the received packets in order to perform fast Fourier transforms (FFTs) and determine the type of interference that maybe present in the environment.

To measure signal strength, the master controller 28 may command the wireless instruments 26 to determine the radio's reported received signal strength indicator (RSSI) of the beacon frames. The master controller 28 may also command the wireless instruments 26 to perform packet capture by analyzing RSSI of other types of packets, e.g., acknowledgement (ACK), probes, etc. The master controller 28 may command the wireless instruments 26 to determine receive sensitivity by transmitting a series of packets at predetermined TX data rates to infer the environment's SNR.

Wireless instrument(s) 26 makes RF and low level packet measurements and transmit and receive data in a manner that simulates the customer's wireless device 27 or application bandwidth requirements to be placed later. For example, the wireless instrument(s) 26 in the family room may make RF and low level measurements and simulate a computer that is surfing the web, and the wireless instrument(s) 26 in the kid's bedroom may simulate a baby monitor that is sending steaming audio. The TV may include audio and video electronic equipment and the basement may include an AP, such as a gateway or router, etc. Wireless instrument(s) 26 makes RF and low level measurements and may be instructed by the master controller 28 to transmit and receive to simulate devices or applications.

After analyzing interference, congestion and signal issues separately and/or in coordination with the master controller 28, the wireless instruments 26 transmit their results to the master controller 28 automatically or a technician utilizes the master controller 28 to collect the information from each wireless instrument(s) 26 (520). As described in more detail in FIG. 6, the user interface device 29 and/or the master controller 28 determines a preferred AP channel based on the information collected by the wireless instruments 26 (522). The user interface device 29 and/or the master controller 28 determines a preferred AP location point (524), as described in more detail in FIGS. 7A-D, 8 and 9.

The user interface device 29 and/or the master controller 28, and/or the user interface 26 together with the master controller 28, may also determine a QoE score for each of wireless instrument(s) 26, e.g., to record a quality of web browsing, voice, video steaming, HD video streaming, IEEE 802.11a, b, g, n, ac, ad, etc., per position of the wireless instruments 26. A goal of the quality of experience QoE metric is to set the customer's expectations about the limitations of their RF environment. The QoE metric may be a weighted average of a collection of scaled measurements. For example, to compute the QoE for a particular room:

$$QoEBedroom(S_{congestion}, S_{interference}, S_{signal}, S_{apps}) = W_{congestion}*S_{congestion} + W_{interference}*S_{interference} + W_{signal}*S_{signal} + W_{apps}*S_{apps}$$

Where:

$W_x$ is the weight for parameter x (e.g., congestion, interference, and signal strength).

$S_x$ is the score for each parameter x.

For example, for $S_{signal}$ it may have been determined through testing that the two methods that provide the most accurate representation of signal strength are RSSI and SNR. Where SNR is slightly better than RSSI. The ranges for each scale may also be determined based on experiments and fine-tuned with the data collected during testing.

$$S \begin{cases} 0 \text{ if } SNR < 5 \\ 1 \text{ if } SNR < 8 \\ 2 \text{ if } SNR < 11 \\ 3 \text{ if } SNR < 14 \text{ or } SNR > 30 \\ 4 \text{ if } SNR < 17 \text{ or } SNR > 20 \\ 5 \text{ if } SNR > 17 \text{ and } SNR < 20 \end{cases}$$

$$S \begin{cases} 0 \text{ if } RSSI < 90 \\ 1 \text{ if } RSSI < 80 \\ 2 \text{ if } RSSI < 70 \\ 3 \text{ if } RSSI < 60 \text{ or } RSSI > 40 \\ 4 \text{ if } RSSI < 65 \text{ or } RSSI > 45 \\ 5 \text{ if } RSSI > 65 \text{ or } RSSI < 45 \end{cases}$$

Ssignal=WRSSI*SRSSI+WSNR*SSNR=(0.4)(3)+(0.6)(5)=4.2. The QoE scores may be mapped per location of each wireless instrument(s) 26 to provide a visual representation of determined quality of experience for the customer at in each location.

The user interface device 29 may also determine a total QoE score for the entire radio frequency environment 10, (e.g. house) in similar fashion using a weighted average of all of the locations of the wireless instruments 26. For example:

QoEHouse=WP1*QoEP1+WP2*QoEP2+WP3*QoEP3+WP4*QoEP4.

In some embodiments, the weights, by default, may be the same for all room locations: W=1/(number of wireless instruments). This is like an arithmetic average. The standard deviation is determined for the available QoEs and this is used to adjust the weight of the QoEs that fall outside 1, 2, 3, etc. standard deviations. Adjustment factors determined through trials may also be applied. A reason for this is that one or two rooms with bad QoE may have bursts of retries and/or use lower data rates. This may impact the available channel capacity for the other rooms when multiple rooms are playing at the same time. For example, a location with a QoEs of 4.5, 4.2, 3.8, and 2.5 results in an average QoE of 3.75. The standard deviation is 0.88 which results in the room with 2.5 falling out of one (1) standard deviation. In this case, the weight of this room may be adjusted from (0.25+0.10=0.35) and the other rooms down to (0.22). This results in a house QoE of 3.58.

Records of the QoE scores may be maintained so that customer service agents and technicians may refer the reports when a customer has a question about the communication performance of their environment 10. For example, the reports may indicate whether web browsing works well in a determined room, and if Netflix™ (a registered trademark of Netflix, Inc.) or other streaming service may operate sufficiently in the room, or whether updates to the environment may be needed. If the result of the testing is not adequate (530), corrective actions may be taken, e.g., adding a repeater to the system, moving the AP, etc., and the master controller 28 may re-initiate testing based on the new configuration (508). If the testing results are acceptable (530), a network performance report including the information determined above may be generated and saved for future reference (534). For example, a Wi-Fi network birth certificate may be generated and the data uploaded to a cloud based server for future reference in the case of service calls or expanded service.

Figure 6:
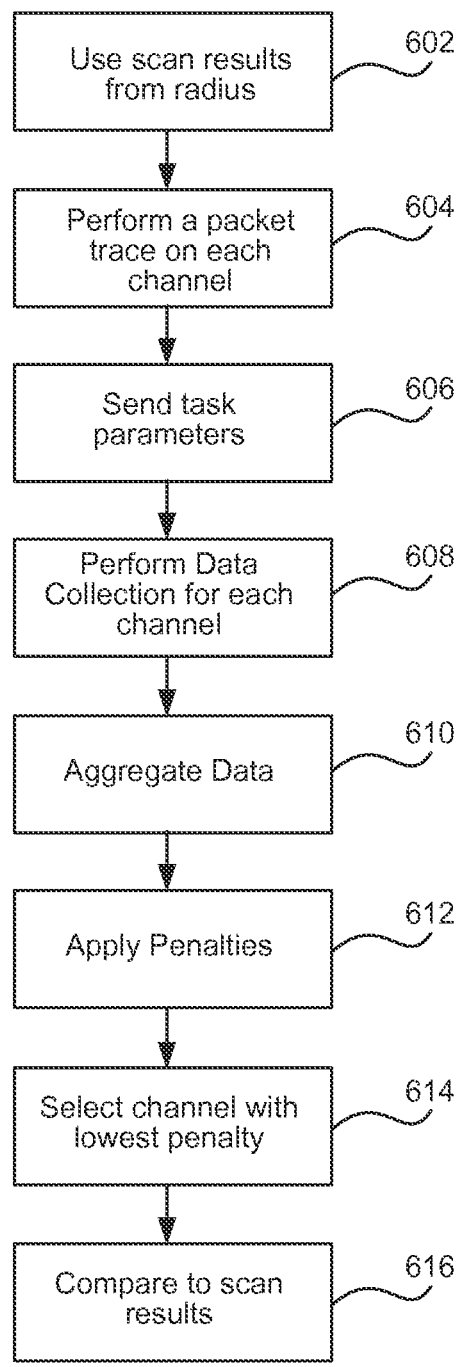
FIG. 6 is a flowchart of an example process for determining channel selection.

FIG. 6 is a flowchart of an example process 600 for determining channel selection. Using scan results from the AP radios, the number of APs in each channel are counted and the channel with the lowest number of APs is picked (602). There is a bias towards picking channels 1, 6, or 11 on the 2.4 GHz band. 5 GHz channels use a different band. Depending on what the radio or operating system provides, a packet trace may be performed for a determined amount of time on each channel, e.g., by analyzing the IEEE 802.11k information inside the beacon (604). The longer the dwell time is the more information may gather about the channel. After scanning each channel the packets are analyzed and stats collected. Once all the channels are scanned, the collected stats are processed and scored each channel. A list of channels may be sorted based on the scores and the channel with the lowest score is selected.

The master controller 28 sends task parameters to the wireless instruments 26 associated with the environment 10 (606). The task parameters may include a channel list, regulatory information (FCC, etc.), and a time to spend monitoring each channel. The wireless instruments 26 in the system perform a packet capture for each channel while sending broadcast probe requests (608). As packets are received the following stats may be collected for each wireless instrument(s) 26: source address, destination address, AP address (BSSID), AP name (SSID) for beacons and probes, signal strength (RSSI) distribution (min, max, average, median), data rate information (min, max, average, median), dissected information elements in beacons and probes, retry information, total medium occupancy (e.g., time computed based on packet length and data rate), and short performed duration bandwidth measurement (or done on a selected number of channels). The collected data is aggregated from all devices (610). Then a set of penalties are applied to each channel based on the data collected (612). The channel(s) with the lowest penalty are selected (614). To verify the channel selection, the channels selected by performing the packet trace may be compared to the channels selected by the scan (616).

FIGS. 7A-D is a screenshot of example reports that may be generated based on information provided by the master controller 28 and the wireless instruments 26 to determine proper placements of the gateway 22. The reports may, for example, be displayed by the user interface device 29 in accordance with some example embodiments. The wireless instruments 26 and master controller 28 are configured as transmit beacons as described above. The master controller 28 performs the channel selection scan. The scan list include a list of devices (access points, e.g., gateways and routers, stations, master controllers 28, wireless instruments 26, etc.) in the area. The AP, e.g., master controller 28 acting as the AP and/or gateway 22, is placed in the middle of a virtual concentric circle. Each wireless instrument(s) 26 is placed at a different outer circle based on at least one of the following: receiving signal strength indicator (RSSI), signal throughput, or QOE score, etc.

Figure 7A:
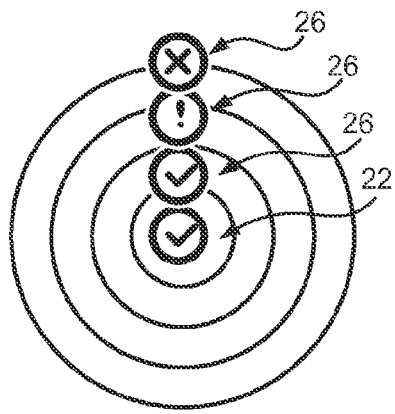
FIGS. 7A-D is a screenshot of example reports that the user interface may display based on information provided by the master controller and the wireless instruments to determine ideal placements of the gateway.
Figure 7B:
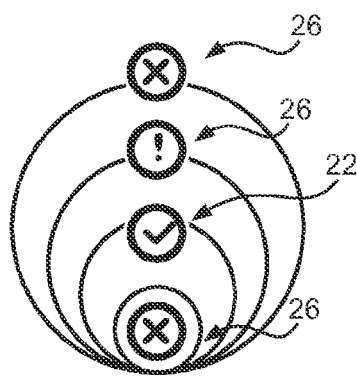
Figure 7C:
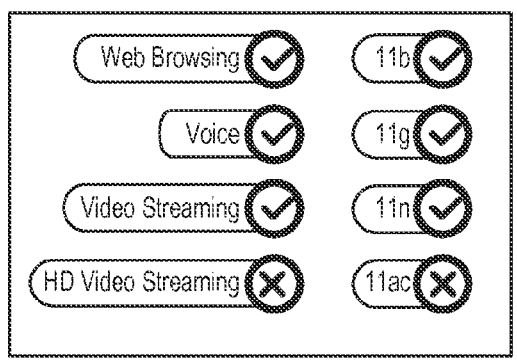
Figure 7D:
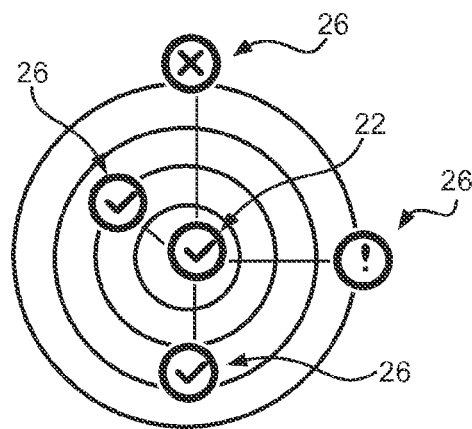

The results may include a checkmark indicator for a valid current location of the wireless instruments 26 and/or gateway 22. For example, in FIG. 7C a valid location of the wireless instrument(s) 26 and/or gateway 22 (also sometimes referred to as proper or satisfactory) may indicate that a position of the wireless instrument(s) 26 may perform their expected functions, e.g., one or more of web browsing, voice, video streaming, HD video streaming, and/or IEEE 802.11b, g, n, ac, etc., based on the congestion, interference and signal strength, etc. in the area 24. Additionally or alternatively, the position may be valid for web browsing but not HD video streaming (e.g., not enough throughput available) and IEEE 802.11ac (not enough SNR available), etc. An explanation point indicator indicates possible degradation of performance at that location, and an X indicates unacceptable performance at that location for the determined function, e.g., due to interference, congestion and/or signal attenuation. For example, the location is not valid for IEEE 802.11ac, but it valid for IEEE 802.11b, g and n. In FIG. 7D each wireless instrument(s) 26 is placed at a different location based on its corresponding outer circle based on a maximum RSSI between each other since each wireless instrument(s) 26 is beaconing and may be in each other's scan results.

The reports may be based on the interference, congestion and signal reach determined above. The reports indicate an optimal location for the wireless gateway 22, and possibly additional access points to the wireless network. In the example of a residential or commercial installation, the technician collects information from each of the wireless instruments 26, then powers on the wireless gateway 22. The master controller 28 pushes login information to each of the wireless instruments 26, and subsequently logs on to the wireless network. The wireless instruments 26 may then simulate the performance requirements of the specific type of wireless device 25 being installed at the location of the placed wireless instrument(s) 26.

Figure 8:
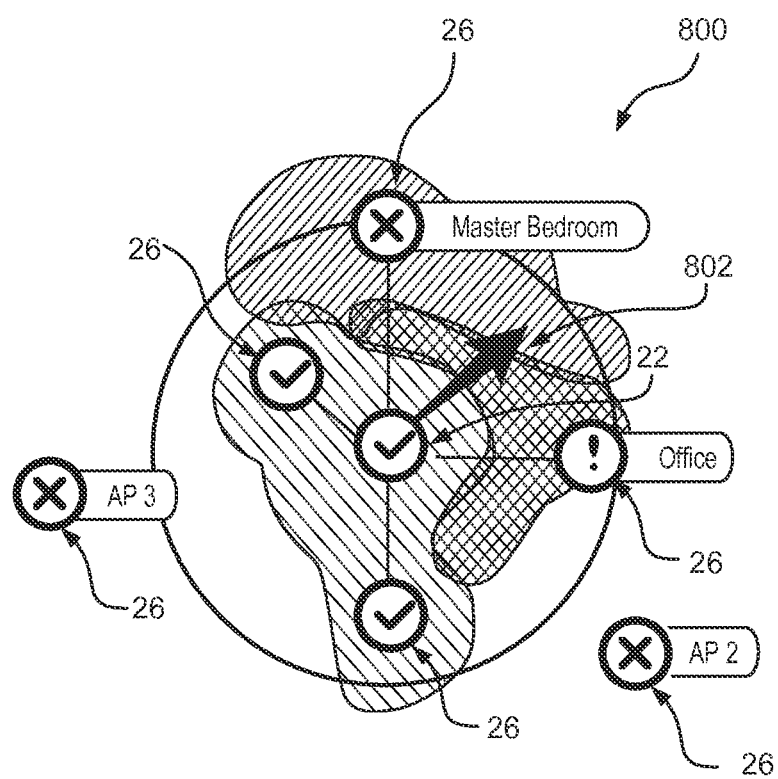
FIG. 8 is a screenshot of an example heat map report based on an analysis of interference, congestion and signal attenuation information received from the wireless instruments and master controller.

FIG. 8 is a screenshot of an example heat map report 800 based on an analysis of interference, congestion and signal attenuation information received from the wireless instruments 26 and master controller 28. The heat map may be constructed based on the reports in FIGS. 7A-D. An ideal location for the gateway 22 may be determined where the RSSI balances between each link. If placement of the gateway 22 should be adjusted, a general direction 802 in which the gateway 22 should be moved may be displayed. The technician may provide name and location information when configuring the wireless instruments 26, e.g., master bedroom on 2nd floor. For each location, interference and congestion may be determined for different signal types, e.g., web browsing, voice, video streaming, high definition (HD) video streaming, Wi-Fi channels, etc. The wireless instrument(s) 26 is able to simulate the capability of different Wi-Fi enabled devices and/or simulate traffic data patterns used by different applications such as streaming video, streaming audio, and/or web surfing services, etc. Any problematic access points, e.g., AP2, AP3, may be determined and a resolution may be offered.

Figure 9:
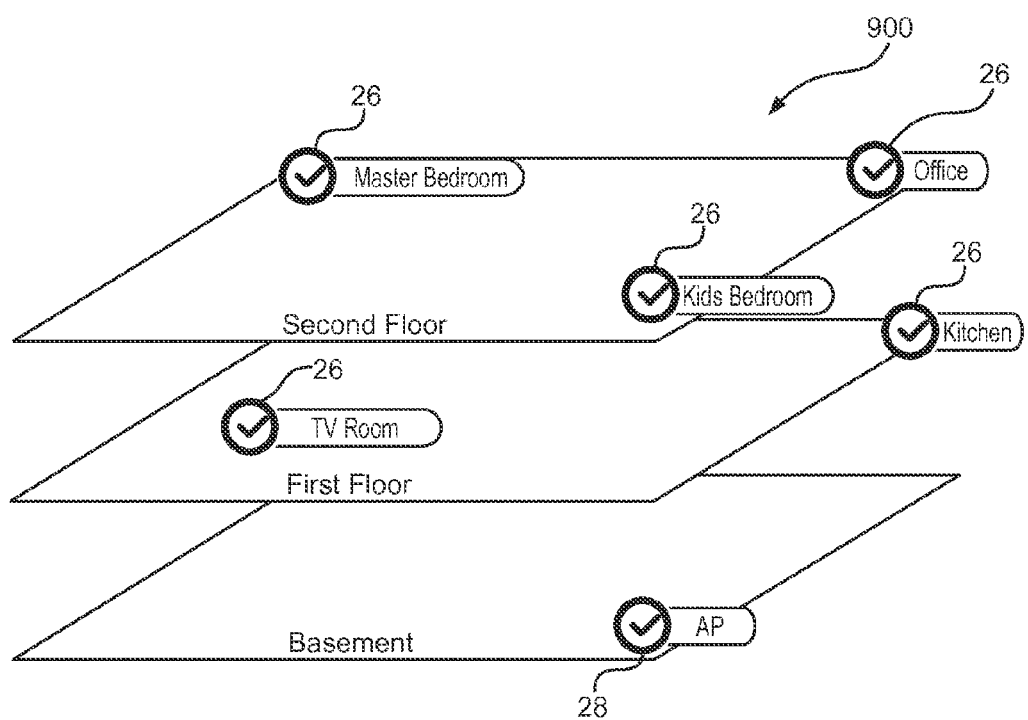
FIG. 9 is an example report illustrating a placement of the wireless instruments and master controller in the environment and status based on their placement.

FIG. 9 is an example report illustrating a placement of the wireless instruments 26 and master controller 28 in the environment 900 and status based on their placement. The environment 900 may include multiple floors, e.g., a basement, first floor and second floor, etc. In this example, wireless instruments 26, are positioned in the TV room, master bedroom, office, kid's bedroom and kitchen. The gateway 28, or other access point, is positioned in the basement. The wireless instruments 26 may be tagged with labels to correlate the wireless instrument(s) 26 to the representation displayed to the technician, e.g., master bedroom, office, kid's bedroom, TV room, kitchen and gateway access point (AP). The checkmark status indicates that a performance based on the current positions of the wireless instruments 26 are meeting the minimum requirements for service, e.g., the wireless instruments 26 are able to perform their expected functions based on determined interference, congestion, and/or signal attenuation, etc.

The performance may be illustrated for signal strength, signal-to-noise ratio, determined applications, e.g., Netflix™, Hulu™ (a registered trademark of Hulu, LLC), Pandora™ (a trademark of Pandora Media, Inc.), etc. When the performance marker is clicked, additional details about the performance may be displayed, e.g., whether the position is individually acceptable or not for web browsing, voice, video streaming, HD video streaming, IEEE 802.11a, b, g, n, ac, ad, etc. For example, the position may be determined to be acceptable for video streaming and IEEE 802.11b but not IEEE 802.11ac.

The master controller 28 may provide (e.g., upload) to the user interface device 29 the analysis of the radio environment determined by each wireless instrument(s) 26 revealing existing location risks. The technician is informed by the user interface device 29, e.g., smart phone, tablet, laptop, PC, etc., as to the optimal locations for the placement of the wireless gateway 22. From the data generated by the master controller 28 and the wireless instruments 26, the technician may infer if the first logical position for the wireless gateway 22 meets the customer quality of service needs. If not the technician may move to the next best position as reported to the UI device for the wireless gateway 22 and quickly repeat the process of validating the quality of service (QOS). Such an inference may be made, for example, by an analysis of the channels being used or the channels that have the most traffic when the technician selects logical wireless gateway 22 positions, or by an analysis of the signal strength between the wireless instrument(s) 26 and the master controller 28 when the technician moves between gateway positions. When the master controller 28 is positioned in that optimal location, the master controller 28 is then used to model the customer's wireless devices 25 to be placed later at each the location of each wireless instrument(s) 26 to validate the network's capability to deliver to the required quality of service.

After the optimal location is determined, e.g., by the master controller 28 which is positioned where the gateway 22 will later be placed, the master controller 28 and the wireless instruments 26 are left operating so as to continuously analyze the existing radio environment to characterize the target spectrum and identify radio interference, network disturbers, existing radio access points, channel allocation and signal strengths of the area being monitored. This may be performed over a period of time ranging from minutes to days. Because information is gathered over a period of time, this avoids the "snapshot" which was previously performed by technicians. Since the information is gathered over a period of time, it is more probable that all interfering devices are operating at some period during the monitoring.

After the information is analyzed by the master controller 28, the gateway 22 is placed in the desired location and is enabled. The master controller 28 is connected to the gateway 22 using a cable or wirelessly. Gateway login information is entered into the master controller 28 and passed to the wireless instruments 26. The wireless instruments 26 drop their connection to the master controller and connect to the gateway 22. The wireless instruments 26, in communication with the gateway while in coordination with the master controller 28, validate the customer's actual wireless network performance and determine the maximum wireless network performance to ensure necessary delivered quality of service and determine future capability. The master controller 28 generates an installation and validation report detailing the pre-deployment radio environment, master controller 28 and gateway validation phase. This report, under the control of the installation team, may be provided to the customer and stored for later use. After it is determined that the gateway 22 is properly positioned, the customer's devices 25 are then positioned in the area 24 and connected to the gateway 22 for subsequent use.

Network degradation may occur after deployment and validation due to repositioning of a device 27, the addition internally and externally of a device 27, broadband external noise or structural modification, etc. If a problem arises after the installation of the gateway 22, one or more wireless instruments 26 may be placed in the area indefinitely while connected to the customers access point to continuously monitor IEEE 802.11 (a/b/g/n), 802.11ac, 802.11ad, etc. environments measuring interference, congestion and signal integrity while calculating the quality of experience in order to determine timing and causes of network degradation. The wireless instrument(s) 26 builds a long term, e.g., an hour, half a day, a day, a week, a month, a year, etc., interference and quality of service map which may be analyzed by the appropriate party to identify static and dynamic issues affecting the customer's quality of experience.

In some instances, the customer dictates to the technician where the gateway 22 is to be placed, for example in an office where is the gateway 22 is less likely to be seen. If the customer dictates the positioning of the gateway 22, the system 20 may be used to advise the customer of potential issues, such as lack of signal strength for a device 27 or interference with the signal for a device 27, with such a placement. In this situation, if it is known that the placement presents an issue, an additional wireless access point may be provided to boost performance of those device 27. Additionally or alternatively, a wireless signal booster or repeater may be added to the environment 10 to improve performance.

Figure 10:
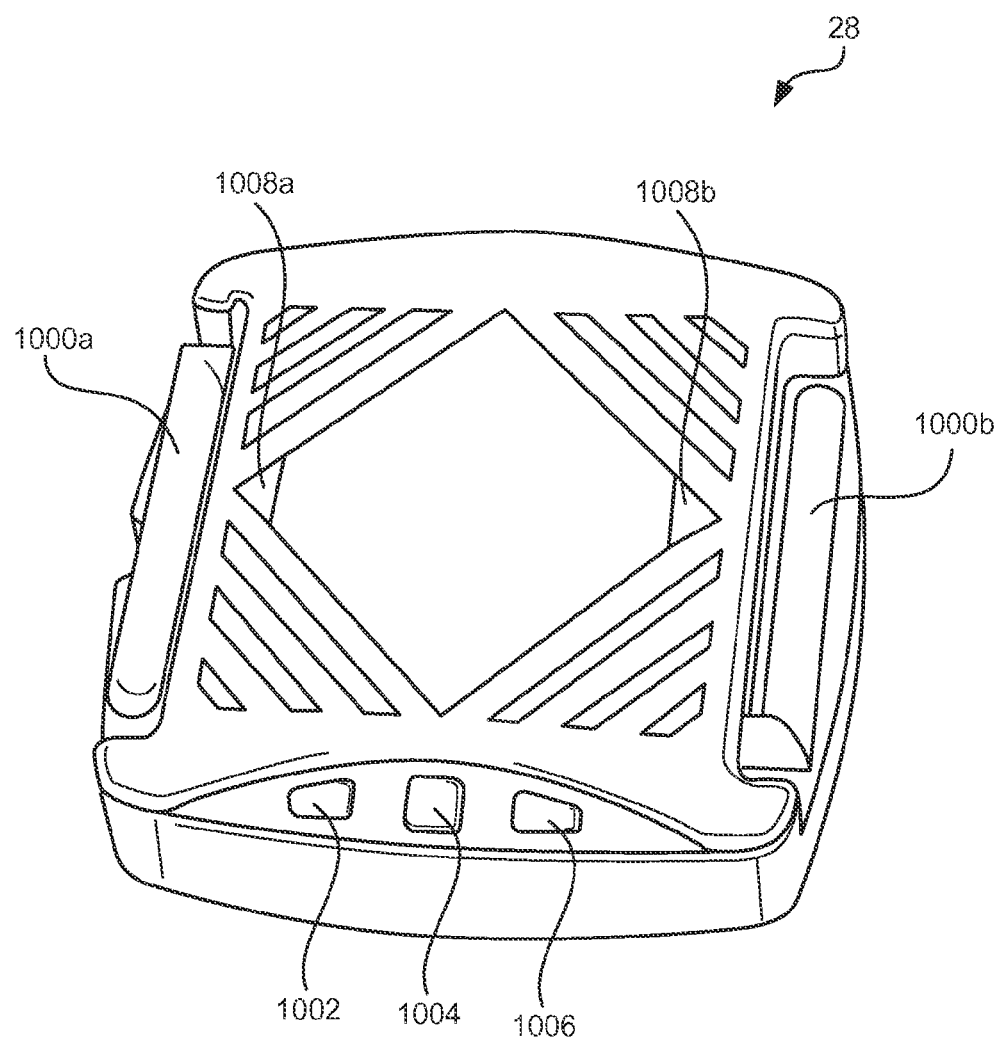
FIG. 10 is a perspective view of an example master controller.

FIG. 10 is a perspective view of an example master controller 28. It will be appreciated that the example of FIG. 10 is provided by way of example, and not by way of limitation, such that other device form factors and selection and arrangement of user interface controls are contemplated within the scope of the disclosure. The master controller 28 includes external dual band antennas 1000a, b. The master controller 28 may include one or more buttons and/or other user input mechanisms, such as buttons 1102, 1104, and 1106. Button 1002 is used to identify the master controller 28 to the user interface device 29 and button 1006 is used to pair the master controller to a wireless instrument(s) 26. Button 1004 is used to power the master controller 28 on and off. The master controller 28 also includes indicators lights 1008a, b to identify operation and power states. Additionally or alternatively, the master controller 28 may be implemented with a smart phone, tablet, laptop or PC, etc.

Figure 11:
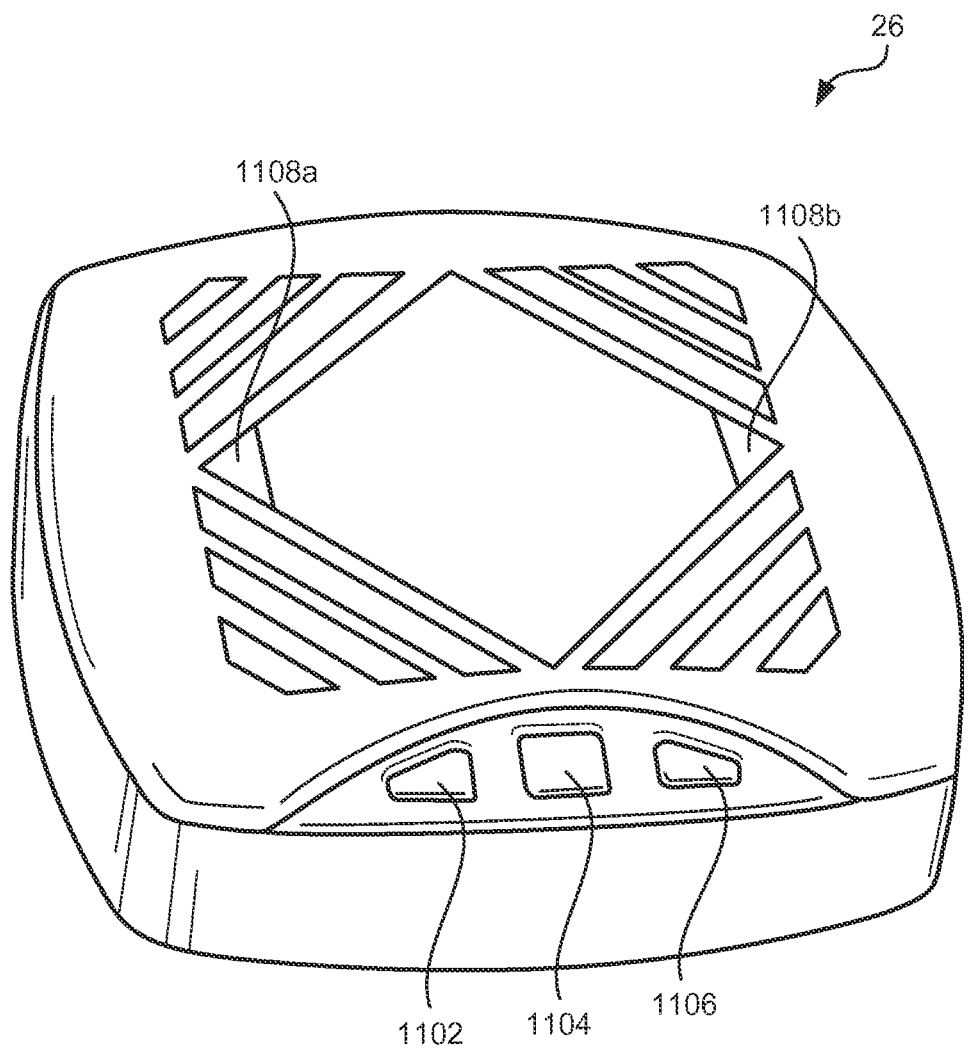
FIG. 11 is a perspective view of an example wireless instrument.

FIG. 11 is a perspective view of an example wireless instrument(s) 26. It will be appreciated that the example of FIG. 11 is provided by way of example, and not by way of limitation, such that other device form factors and selection and arrangement of user interface controls are contemplated within the scope of the disclosure. The wireless instrument(s) 26 includes one or more buttons and/or other user input mechanisms, such as buttons 1102, 1104, and 1106. Button 1102 is used to identify the wireless instrument(s) 26 to the user interface device 29. Button 1106 is used to pair the wireless instrument(s) 26 to the master controller 28. Button 1104 is used to power the wireless instrument(s) 26 on and off. The wireless instrument(s) 26 also includes indicators lights 1108a, b to identify operation and power states. Additionally or alternatively, the wireless instrument(s) 26 may be implemented with a smart phone, tablet, laptop or PC, etc.

Figure 12A:
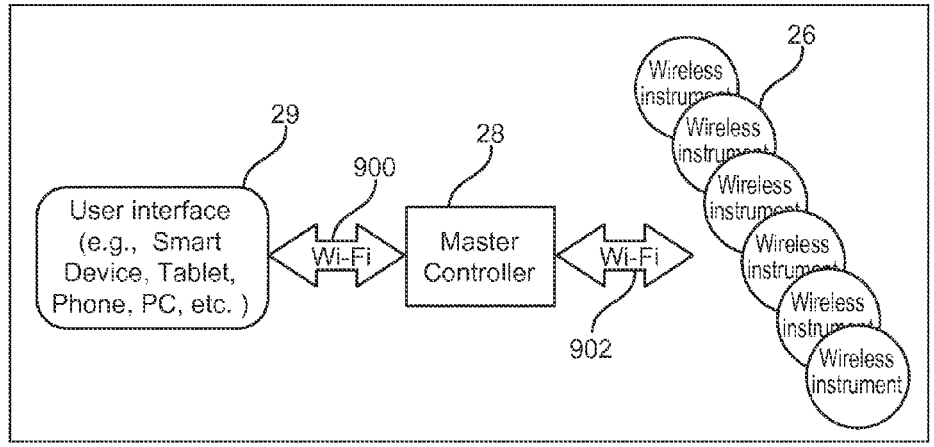
FIGS. 12A and 12B are block diagrams of example connections of the user interface to the master controller and wireless instruments.
Figure 12B:
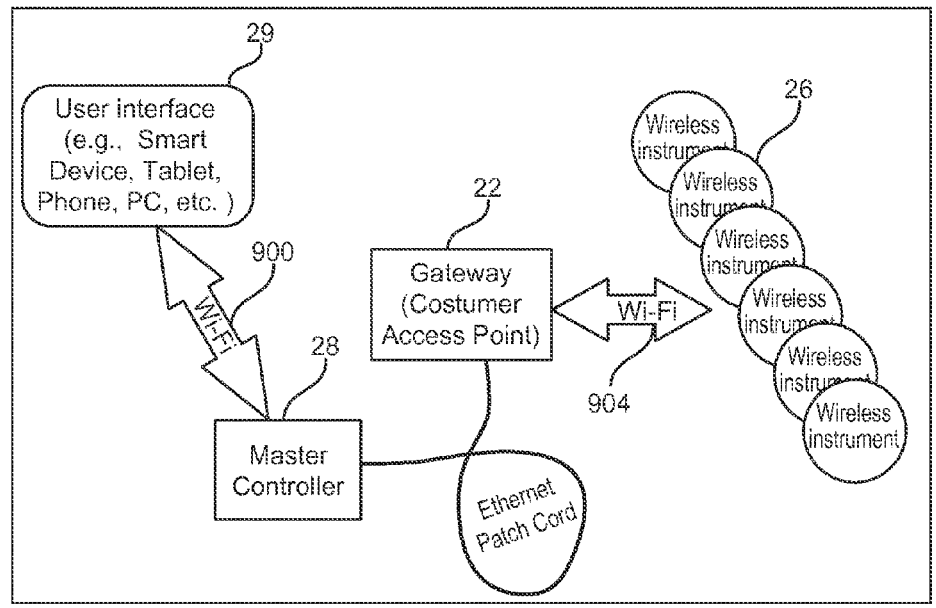

FIGS. 12A and 12B are block diagrams of example connections of the user interface device 29 to the master controller 28 and wireless instruments 26. In FIG. 12A, to test the environment 10 the user interface device 29 sends commands to the master controller 28, e.g., via a Wi-Fi connection. It will be appreciated that the illustration of a Wi-Fi connection between user interface device 29 and master controller 28 is provided by way of example, and not by way of limitation. In this regard, other types of connections may accommodate communication between the user interface device 29 and the master controller 28, whether wireless or wired, within the scope of the disclosure. The master controller 28 communicates with the wireless instruments 26 with a Wi-Fi connection 902. Other types of connections may accommodate communication between the master controller 28 and the wireless instruments 26, whether wireless or wired. In FIG. 12B, during a verification process of a wireless quality of the environment 10, the gateway 22, or other customer AP, is connected with the master controller 26 via a wire, e.g., an Ethernet patch cord. The gateway 22 communicates with the wireless instruments 26 via Wi-Fi or other connection.

While various example embodiments have been described with respect to application in Wi-Fi networks, it will be appreciated that example embodiments may be applied mutatis mutandis to provide a distributed system including a master controller and one or more wireless instruments enabling analysis of wireless spectrum used by other wireless networking technologies and/or to determine appropriate placement of devices using such other wireless networking technologies within the scope of the disclosure. By way of non-limiting example, techniques described in accordance with some embodiments may be used to facilitate analysis of a placement position for a small cell cellular base station (e.g., a femtocell, nanocell, or the like), such as may be used with a licensed and/or unlicensed band. As an additional example, some embodiments may be used to facilitate analysis of a placement position for a base station that may be used to provide cellular voice and/or data services over an unlicensed spectrum, such as a Long Term Evolution-Unlicensed (LTE-U) base station. As a further example, some embodiments may be used to facilitate analysis of a placement position for a personal cellular hot spot device that may be configured to provide a Wi-Fi access point and a gateway to a cellular network.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A system for evaluating a wireless network deployment, the system comprising:
   a plurality wireless instruments, each configured to send, receive and measure received wireless signals in a monitored area, each of the wireless instruments in the plurality being further configured such that a first wireless instrument in the plurality is configured to simulate a data-streaming application, and a second wireless instrument in the plurality is configured to simulate a web-surfing application;

a master controller connected with each of the wireless instruments to form a distributed wireless network testing solution, the master controller being locatable to a proposed access-point location and being configured to send and receive wireless signals with each of the plurality of wireless instruments, measure received wireless signals and perform an analysis of the wireless signals to determine a quality of experience value for the distributed wireless network based on the wireless signals, wherein the quality of experience value is calculated based on a plurality of measurements; and where one or more of the master controller and the wireless instrument is configured to determine a placement of a wireless access point based on the analysis, and a user interface associated with the master controller is configured to display a suggested direction for relocation of an access point intended for deployment.

2. The system of claim 1, where one or more of the master controller, the first wireless instrument, and the second wireless instrument are configured to determine a quality of service value at a location of at least one of the first wireless instrument and the second wireless instrument both connected with the master controller or an access point based on the analysis.

3. The system of claim 1, where one or more of the master controller and the wireless instruments in the plurality are configured to determine a quality of service value for an entire radio frequency environment based on the analysis.

4. The system of claim 1, where one or more of the master controller and at least one wireless instrument in the plurality is configured to select preferred wireless access point channels based on the analysis.

5. The system of claim 1, where the master controller is configured to determine a maximum available data bandwidth between an access point and a wireless device based on the analysis.

6. The system of claim 1, where the master controller is configured to determine the quality of experience value for an entire radio frequency environment based on the analysis.

7. The system of claim 1, where the master controller is configured to act as an access point to the plurality of wireless instruments.

8. The system of claim 1, further comprising a user interface connected with the master controller, where the user interface is configured to command the master controller to test the wireless network performance.

9. The system of claim 1, where the wireless instrument comprises a plurality of wireless instruments to test an entire radio frequency environment at once.

10. The system of claim 1, wherein each wireless instrument in the plurality is configured to simulate a capability of one of a plurality of various Wi-Fi enabled devices and simulate traffic data patterns used by applications including one or more of streaming video, streaming audio, and web surfing services.

11. The system of claim 1 wherein the master controller is configured to generate and display a report that (i) illustrates placements of the plurality of wireless instruments and the master controller in an environment, and (ii) includes a performance status indicator for each instrument based on the placements.

12. The system of claim 11 wherein the report includes a direction in which an access point should be moved.

13. The system of claim 12 wherein the placements are reflected in a three-dimensional representation of a structure.

14. The system of claim 13 wherein the three-dimensional representation of a structure includes floors on which the placements are made.

15. The system of claim 1 wherein the master controller is configured to calculate the quality of experience value for a network including the master controller and the plurality of wireless instruments, and the plurality of measurements include interference data, channel utilization data, signal strength data, and local quality-of-experience metrics.

16. The system of claim 1 wherein the quality of experience value is calculated for a particular location of one of the plurality of wireless instruments and the master controller, and the value is used to indicate functionality at the particular location in a report generated.

17. A wireless instrument, comprising:

a processor configured to analyze a radio frequency environment, the radio frequency environment including an access point and one or more wireless instruments, the processor configured to: (i) enable the one or more wireless devices to execute diverse device simulations including both data streaming and internet browsing applications, and (ii) determine a quality of experience value for an entire radio frequency environment at once, wherein the wherein the quality of experience value is calculated based at least in part on a plurality of signal measurements; and wherein the processor is further configured to, along with a master controller, generate and present a direction in which an access point should be moved on a display.

18. The wireless instrument of claims 17, where the processor is configured to parse channel information from access point beacons to determine a channel width supported by the access point.

19. The wireless instrument of claim 17, where the processor is configured to perform a packet capture and analyze Wi-Fi traffic to determine a number and a type of stations connected to the access point.

20. The wireless instrument of claim 17, where the processor is configured to parse 802.11k information to determine one or more of a number of clients connected to the access point and a channel utilization factor.

21. The wireless instrument of claim 17, where the processor is configured to perform a packet capture and analyze traffic to determine a channel utilization based on a packet length and a transmit data rate.

22. The wireless instrument of claim 17, where the processor is configured to measure a time from when a packet is queued to when the packet arrives at a receiver.

23. The wireless instrument of claim 17, where the processor is configured to perform a packet capture and analyze traffic to determine a percentage of traffic that is a retry.

24. The wireless instrument of claim 17, where the processor is configured to perform a throughput measurement by simulating a capability of different Wi-Fi enabled devices or simulating traffic data patterns used by different applications including one or more of streaming video, streaming audio, and web surfing services.

25. A system for evaluating a WLAN network deployment in a deployment environment, comprising:

a master controller;

a user interface device; and a plurality of wireless instruments, positioned in a respective plurality of locations within the deployment environment, each wireless instrument in each respective location configured to:
  generate, send, and receive WLAN traffic to measure interference from other WLAN network sources in the respective location;
  generate, send, and receive WLAN traffic to measure interference from non-WLAN sources in the respective location;
  generate, send, and receive WLAN traffic to measure channel utilization for a plurality of channels in the respective location;
  generate, send, and receive traffic to measure signal strength for the master controller in the respective location;
  transmit WLAN interference data for the respective location to the master controller;
  transmit non-WLAN interference data for the respective location to the master controller;
  transmit channel utilization data for the respective location to the master controller; and
  transmit signal strength data for the respective location to the master controller,
wherein the master controller is configured to:
  send and receive WLAN traffic to measure interference from other WLAN sources at each of the plurality of locations;
  send and receive WLAN traffic to measure interference from non-WLAN sources at each of the plurality of locations;
  send and receive WLAN traffic to measure channel utilization for the plurality of each of channels at the plurality of locations;
  send and receive traffic to measure signal strength for the each of the wireless instruments in each of the plurality of locations;
  receive, from each of the plurality of wireless instruments, the WLAN interference data for the respective plurality of locations;
  receive, from each of the plurality of wireless instruments, the non-WLAN interference data for the respective plurality of locations;
  receive, from each of the plurality of wireless instruments, the channel utilization data for the respective plurality of locations;
  receive, from each of the plurality of wireless instruments, the signal strength data for the respective plurality of locations;
  determine, based on the received WLAN interference data, non-WLAN interference data, channel utilization data, and signal strength data for the plurality of locations, an access point channel for the WLAN network deployment;
  calculate, for each location of the plurality of locations and based on the received WLAN interference data, non-WLAN interference data, channel utilization data, and signal strength data for the location, a local quality-of-experience metric for that location;
  calculate, based on the quality-of-experience metrics for the plurality of locations, a quality-of-experience metric for the overall WLAN network deployment, and
wherein the user interface is configured to:
  display a report illustrating whether each location of the plurality of locations is valid for each of a plurality of applications, wherein the plurality of applications includes web browsing, voice, video streaming, high-definition video streaming based at least in part on the WLAN interference data, non-WLAN interference data, channel utilization data, and signal strength data for the plurality of locations received by the master controller; and
  display a heat-map report based at least in part on the WLAN interference data, non-WLAN interference data, channel utilization data, and signal strength data for the plurality of locations received by the master controller.

* * * * *